(12) United States Patent
Malik et al.

(10) Patent No.: US 12,025,079 B2
(45) Date of Patent: Jul. 2, 2024

(54) ROCKET ENGINE WITH DUAL CONTOUR NOZZLE

(71) Applicant: Innovative Rocket Technologies Inc., East Islip, NY (US)

(72) Inventors: Asad Malik, East Islip, NY (US); Jeffery Alan Muss, Sacramento, CA (US)

(73) Assignee: Innovative Rocket Technologies Inc., East Islip, NY (US)

( * ) Notice: Subject to any disclaimer, the term of this patent is extended or adjusted under 35 U.S.C. 154(b) by 0 days.

(21) Appl. No.: 18/046,790

(22) Filed: Oct. 14, 2022

(65) Prior Publication Data
US 2024/0125291 A1   Apr. 18, 2024

(51) Int. Cl.
  *F02K 9/97*  (2006.01)
  *F02K 9/82*  (2006.01)

(52) U.S. Cl.
  CPC . *F02K 9/97* (2013.01); *F02K 9/82* (2013.01)

(58) Field of Classification Search
  CPC .................................. F02K 9/82; F02K 9/97
  See application file for complete search history.

(56) References Cited

U.S. PATENT DOCUMENTS

| | | | | |
|---|---|---|---|---|
| 3,151,446 A | * | 10/1964 | Parilla | F02K 9/80 60/260 |
| 3,925,982 A | * | 12/1975 | Mueller | F02K 9/82 239/265.17 |
| 4,947,644 A | * | 8/1990 | Hermant | F02K 9/97 239/265.17 |
| 6,996,973 B2 | * | 2/2006 | Dujarric | F02K 9/97 239/265.17 |
| 8,220,249 B2 | * | 7/2012 | Kimura | F02K 9/58 239/265.17 |
| 2011/0219742 A1 | * | 9/2011 | Mungas | F02K 9/97 60/770 |
| 2020/0263636 A1 | * | 8/2020 | Malik | F02K 9/56 |

OTHER PUBLICATIONS

Grisnik, Stanley P., Experimental Study of Low Reynolds No. Nozzles, May 11-13, 1987, 19th International Electric Propulsion Conference cosponsored by the AIAA, DGLR, and JSASS (Year: 1987).*
Bourne, M., Radius of Curvature, Dec. 2, 2020, Interactive Mathematics (Year: 2020).*
Davis, Kate, Experimental and Computational Investigation of a Dual-Bell Nozzle, Jan. 5-9, 2015, AIAA SciTech Forum, (Year: 2015).*

* cited by examiner

*Primary Examiner* — Kyle Robert Thomas
(74) *Attorney, Agent, or Firm* — GREENBERG TRAURIG, LLP

(57) ABSTRACT

Some embodiments of the present disclosure are directed to a rocket engine, comprising a primary chamber and a double contour nozzle attached to the primary chamber. In some embodiments, the double contour nozzle comprises an inner contour nozzle comprising a conical contour; an outer contour nozzle comprising a bell contour and at least one propellant injection orifice; and a contour break point between the inner contour nozzle and the outer contour nozzle. Ins some embodiments, the outer contour nozzle comprises a radius of curvature of less than 0.75 and a tangency angle of 40 to 90 degrees on a surface adjacent to the contour break point.

17 Claims, 3 Drawing Sheets

ROCKET ENGINE WITH DUAL CONTOUR NOZZLE

FIELD

The present disclosure relates to rocket engines with dual contour nozzles, which are used for both rocket take-off and landing.

BACKGROUND

Traditional nozzles on rocket engines have a single contour, which may have a bell contour or a conical contour. These traditional nozzles on rocket engines are shaped so that as gases flow therethrough, the gases are expanded to an area ratio (AR) that is lower than ambient pressure (i.e., the pressure at sea-level). Mechanisms are needed in rocket engines to optimize gas expansion in the nozzles at sea-level and at higher altitudes, so that the rocket engine can effectively be used for both rocket take-off and landing.

SUMMARY

Covered embodiments are defined by the claims, not this summary. This summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Some embodiments of the present disclosure relate to a rocket engine comprising a primary chamber and a double contour nozzle attached to the primary chamber. In some embodiments, the double contour nozzle comprises an inner contour nozzle comprising a conical contour and an outer contour nozzle comprising a bell contour and at least one propellant injection orifice. In some embodiments, the double contour nozzle comprises a contour break point between the inner contour nozzle and the outer contour nozzle. In some embodiments, the outer contour nozzle comprises a radius of curvature of less than 0.75 and a tangency angle of 40 to 90 degrees on a surface adjacent to the contour break point.

In some embodiments, the radius of curvature of the outer contour nozzle on the surface adjacent to the contour break point is less than 0.5.

In some embodiments, the tangency angle on the surface of the outer contour nozzle adjacent to the contour break point is 40 to 80 degrees.

In some embodiments, the outer contour nozzle comprises a plurality of propellant injection orifices.

In some embodiments, the outer contour nozzle further comprises an outer contour nozzle exit and an axial length extending from the contour break point to the outer contour nozzle exit. In some embodiments, the at least one propellant injection orifice is positioned downstream of the contour break point from 0-15% along the axial length of the outer contour nozzle.

In some embodiments, the at least one propellant injection orifice is positioned downstream of the contour break point from 0-10% along the axial length of the outer contour nozzle.

In some embodiments, the primary chamber is configured to receive a liquid propellant, a solid propellant, a hybrid propellant, or any combination thereof.

In some embodiments, the at least one propellant injection orifice is configured to receive a liquid propellant, a solid propellant, a hybrid propellant, or any combination thereof.

Some embodiments of the present disclosure are directed to a rocket engine comprising a primary chamber and a double contour nozzle attached to the primary chamber, wherein the double contour nozzle comprises an inner contour nozzle comprising a conical contour and an outer contour nozzle comprising a bell contour, an outer contour nozzle exit, and at least one propellant injection orifice. In some embodiments, the double contour nozzle comprises a contour break point between the inner contour nozzle and the outer contour nozzle. In some embodiments, the outer contour nozzle further comprises an axial length extending from the contour break point to the outer contour nozzle exit, and the at least one propellant injection orifice is positioned downstream of the contour break point from 0-15% along the axial length of the outer contour nozzle.

In some embodiments, the outer contour nozzle comprises a radius of curvature of less than 0.75 and a tangency angle of 40 to 90 degrees on a surface adjacent to the contour break point.

In some embodiments, the outer contour nozzle further comprises an augmenter.

In some embodiments, the augmenter is positioned within the outer contour nozzle downstream of the contour break point from 0-15% along the axial length of the outer contour nozzle.

In some embodiments, the augmenter is positioned within the outer contour nozzle downstream of the contour break-point from 0-10% along the axial length of the outer contour nozzle.

DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Figure 1:
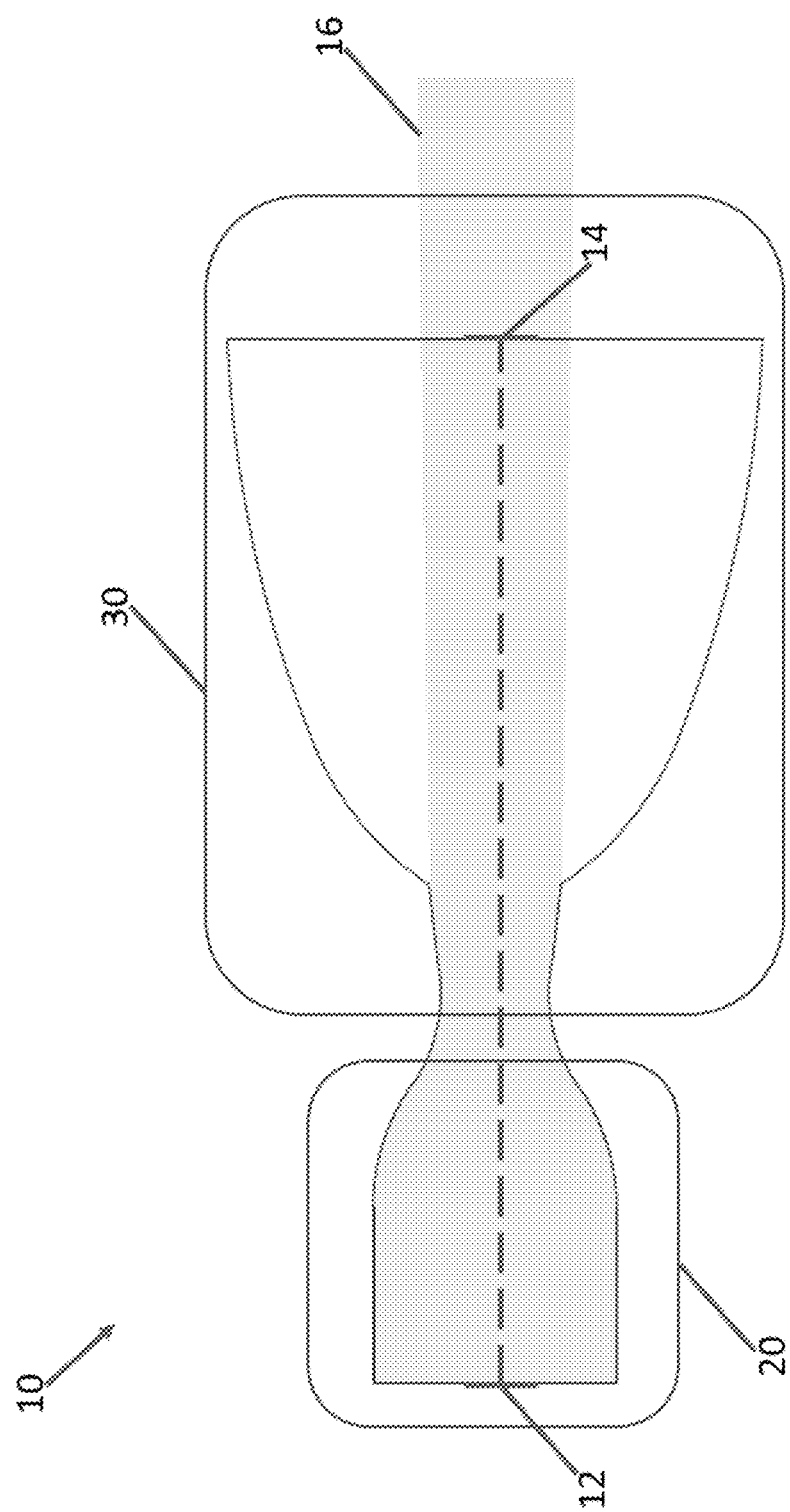
FIG. 1 is a cross-sectional view of a rocket engine according to an embodiment of the present disclosure.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, terms such as "comprising" "including," and "having" do not limit the scope of a specific claim to the materials or steps recited by the claim.

As used herein, the term "consisting essentially of" limits the scope of a specific claim to the specified materials or steps and those that do not materially affect the basic and novel characteristic or characteristics of the specific claim.

As used herein, terms such as "consisting of" and "composed of" limit the scope of a specific claim to the materials and steps recited by the claim.

All prior patents, publications, and test methods referenced herein are incorporated by reference in their entireties.

As used herein, the term "conical contour" refers to a rocket engine nozzle with an axial length having a first end with a first radius and a second end with a second radius. In some embodiments, the second radius is greater than the first radius, and the radius of the nozzle expands at a constant rate from the first radius to the second radius. In some embodiments, the term "conical contour" further refers to a rocket nozzle where a cross-section of the rocket nozzle alone the axial length has a conical shape.

As used herein, the term "bell contour" refers to a rocket engine nozzle with an axial length having a first end with a first radius and a second end with a second radius. In some embodiments, the second radius is greater than the first radius, and the radius of the nozzle does not expand at a constant rate from the first radius to the second radius. In some embodiments, the term "bell contour" refers to a rocket nozzle where a cross-section of the rocket nozzle alone the axial length has a bell shape.

As used herein, the term "hybrid propellant" refers to a propellant that includes a solid propellant and at least one of a liquid propellant or a gas propellant.

As used herein, the term "tangency angle" refers to the angle of a line tangent to the rocket engine's interior surface.

Some embodiments of the present disclosure are directed to a rocket engine. In some embodiments the rocket engine includes a primary chamber. In some embodiments, the primary chamber is a combustion chamber. In some embodiments, the primary chamber includes a first end and a second end. In some embodiments, the primary chamber includes an axial length with a first end and a second end. In some embodiments, the first end of the primary chamber corresponds to the first end of the primary chamber's axial length. In some embodiments, the second end of the primary chamber corresponds to the second end of the primary chamber's axial length.

In some embodiments, the primary chamber is configured to receive at least one propellent through its first end. In some embodiments, the at least one propellant includes a liquid propellant, a solid propellant, a hybrid propellant, or any combination thereof. In some embodiments, the primary chamber is configured to receive a plurality of propellants in some embodiments the plurality of propellants include the same type of propellant, i.e., a solid propellant, a liquid propellant, or a hybrid propellant. In some embodiments, the plurality of propellants are not the same type of propellant. For example, in some embodiments, the primary chamber is configured to receive, at the same or substantially the same time, a liquid propellant and a solid propellant, a liquid propellant and a hybrid propellant, a solid propellant and a hybrid propellant, or any combination thereof.

In some embodiments, the at least one propellant can be injected into the primary chamber using a pressure fed power cycle, an electric pump power cycle, a gas generator power cycle, a staged power cycle, a full flow staged power cycle, and expander power cycle, a combustion tap-off power cycle, or any combination thereof.

In some embodiments, the rocket engine includes a double contour nozzle. In some embodiments, the double contour nozzle is attached to the primary chamber. In some embodiments, the double contour nozzle includes a first end and a second end. In some embodiments, the double contour nozzle includes an axial length with a first end and a second end. In some embodiments, the first end of the double contour nozzle corresponds to the first end of the double contour nozzle's axial length. In some embodiments, the second end of the double contour nozzle corresponds to the second end of the double contour nozzle's axial length.

In some embodiments, the first end of the double contour nozzle is directly attached to the second end of the primary chamber. In some embodiments, the first end of the double contour nozzle is indirectly attached to the second end of the primary chamber. For example, in some embodiments, the rocket engine includes a throat. In some embodiments, the throat is between the second end of the primary chamber and the first end of the double contour nozzle.

In some embodiments, the double contour nozzle includes an inner contour nozzle. In some embodiments, the inner contour nozzle includes a first end and a second end. In some embodiments, the inner contour nozzle includes an axial length with a first end and a second end. In some embodiments, the first end of the inner contour nozzle corresponds to the first end of the inner contour nozzle's axial length. In some embodiments, the second end of the inner contour nozzle corresponds to the second end of the inner contour nozzle's axial length. In some embodiments, the first end of the inner contour nozzle corresponds to the first end of the double contour nozzle.

In some embodiments, the inner contour nozzle includes a conical contour. In some embodiments, the inner contour nozzle includes a conical contour along at least a portion of the inner contour nozzle's axial length. In some embodiments, the inner contour nozzle includes a conical contour along the entirety of the inner contour nozzle's axial length. In some embodiments, the inner contour nozzle includes a bell contour. In some embodiments, the inner contour nozzle includes a bell contour along at least a portion of the inner contour nozzle's axial length. In some embodiments, the inner contour nozzle includes a bell contour along the entirety of the inner contour nozzle's axial length.

In some embodiments, the double contour nozzle includes an outer contour nozzle. In some embodiment, the outer contour nozzle includes a first end and a second end. In some embodiments, the outer contour nozzle includes an axial length with a first end and a second end. In some embodiments, the first end of the outer contour nozzle corresponds to the first end of the outer contour nozzle's axial length. In some embodiments, the second end of the outer contour nozzle corresponds to the second end of the outer contour nozzle's axial length. In some embodiments, the second end of the outer contour nozzle corresponds to the second end of the double contour nozzle.

In some embodiments, the outer contour nozzle includes a bell contour. In some embodiments, the outer contour nozzle includes a bell contour along at least a portion of the outer contour nozzle's axial length. In some embodiments, the outer contour nozzle includes a bell contour along the entirety of the outer contour nozzle's axial length. In some embodiments, the outer contour nozzle includes a conical contour. In some embodiments, the outer contour nozzle includes a conical contour along at least a portion of the outer contour nozzle's axial length. In some embodiments, the outer contour nozzle includes a conical contour along the entirety of the outer contour nozzle's axial length.

In some embodiments, the double contour nozzle includes a contour break point. In some embodiments, the contour break point is between the inner contour nozzle and the outer contour nozzle. In some embodiments, the contour break point is between the second end of the inner contour nozzle and the first end of the outer contour nozzle.

In some embodiments, the outer contour nozzle includes at least one propellant injection orifice. In some embodiments, the outer contour nozzle includes a plurality of propellant injection orifices. In some embodiments, the at least one propellant injection orifice is configured to receive a liquid propellant, a solid propellant, a hybrid propellant, or any combination thereof. In some embodiments, the plurality of injection orifices are configured to receive a liquid propellant, a solid propellant, a hybrid propellant, or any combination thereof.

In some embodiments, the at least one propellant can be injected into the at least one propellant injection orifice using a pressure fed power cycle, an electric pump power cycle, a gas generator power cycle, a staged power cycle, a full flow staged power cycle, and expander power cycle, a combustion tap-off power cycle, or any combination thereof.

In some embodiments, the at least one propellant injection orifice is positioned downstream of the contour break point from 0-15% along the axial length of the outer contour nozzle. In some embodiments, the at least one propellant injection orifice is positioned downstream of the contour break point from 0 to 10% along the axial length of the outer contour nozzle, from 0 to 5% along the axial length of the outer contour nozzle, from 0 to 3% along the axial length of the outer contour nozzle, or from 0 to 1% along the axial length of the outer contour nozzle. In some embodiments, the at least one propellant injection orifice is positioned downstream of the contour break point from 5 to 15% along the axial length of the outer contour nozzle, from 10 to 15% along the axial length of the outer contour nozzle, or from 5 to 10% along the axial length of the outer contour nozzle.

In some embodiments the outer contour nozzle comprises a radius of curvature of less than 1 on a surface adjacent to the contour break point. In some embodiments, outer contour nozzle comprises a radius of curvature of less than 0.75 on a surface adjacent to the contour break point. In some embodiments, the outer contour nozzle comprises a radius of curvature of less than 0.5 on a surface adjacent to the contour break point. In some embodiments, the outer contour nozzle comprises a radius of curvature of less than 0.25 on a surface adjacent to the contour break point. In some embodiments, the outer contour nozzle comprises a radius of curvature of less than 0.1 on a surface adjacent to the contour break point.

In some embodiments, the outer contour nozzle comprises a tangency angle from 40 to 90 degrees on a surface adjacent to the contour break point. In some embodiments, the outer contour nozzle comprises a tangency angle from 45 to 90 degrees, from 50 to 90 degrees, from 55 to 90 degrees, from 60 to 90 degrees, from 65 to 90 degrees, from 70 to 90 degrees, from 75 to 90 degrees, from 80 to 90 degrees, from 85 to 90 degrees, from 40 to 85 degrees, from 40 to 80 degrees, from 40 to 75 degrees, from 40 to 70 degrees, from 40 to 65 degrees, from 40 to 60 degrees, from 40 to 55 degrees, from 40 to 50 degrees, from 40 to 45 degrees, from 45 to 85 degrees, from 50 to 80 degrees, from 55 to 75 degrees, or from 60 to 70 degrees on a surface adjacent to the contour break point.

In some embodiments, the rocket engine includes an augmenter. In some embodiments, the augmenter is positioned within the outer contour nozzle downstream of the contour break point from 0-15% along the axial length of the outer contour nozzle. In some embodiments, the augmenter is positioned downstream of the contour break point from 0 to 10% along the axial length of the outer contour nozzle, from 0 to 5% along the axial length of the outer contour nozzle, from 0 to 3% along the axial length of the outer contour nozzle, or from 0 to 1% along the axial length of the outer contour nozzle. In some embodiments, the augmenter is positioned downstream of the contour break point from 5 to 15% along the axial length of the outer contour nozzle, from 10 to 15% along the axial length of the outer contour nozzle, or from 5 to 10% along the axial length of the outer contour nozzle.

In some embodiments, the augmenter includes a plurality of propellant injection orifices. In some embodiments, at least one of the plurality of propellant injection orifices in the augmenter is configured to receive a liquid propellant, a solid propellant, a hybrid propellant, or any combination thereof. In some embodiments, at least one of the plurality of propellant injection orifices in the augmenter is configured to receive an oxidizer. In some embodiments, the plurality of injection orifices in the augmenter are in the same axial plane. In some embodiments, a first one of the plurality of injection orifices in the augmenter is in a different axial plant from at second one of the plurality of injection orifices in the augmenter. In some embodiments, the plurality of injection orifices in the augmenter are in concentric rings.

In some embodiments, the inner contour nozzle includes an expansion ratio. In some embodiments, the expansion ratio is selected to work with the augmenter to provide thrust augmentation during lift-off of the rocket engine. In some embodiments, the expansion ratio of the inner contour nozzle is selected to provide highly under-expanded flow during lift-off of the rocket engine and over-expanded flow during landing of the rocket engine. In some embodiments, the expansion ratio of the inner contour nozzle is selected to maximize flow stability of the exhaust gases at reduced ambient pressure, and also to support pressure matching conditions during lift-off thrust augmentation operation.

In some embodiments, the inner contour nozzle includes a first area ratio ("AR"). In some embodiments, the first AR is the cross-sectional area of the inner contour nozzle at the first end of the inner contour nozzle. In some embodiments, the inner contour nozzle includes a second AR. In some embodiments, the second AR is the cross-sectional area of the inner contour nozzle at the second end of the inner contour nozzle. In some embodiments, the expansion ratio of the inner contour nozzle is the ratio of the second AR to the first AR.

The present disclosure will now be described with reference to non-limiting exemplary embodiments depicted in FIGS. 1-3.

FIG. 1 depicts a cross-section of rocket engine 10 according to an embodiment of the present disclosure. As shown in FIG. 1, the rocket engine 10 includes a primary chamber 20 and a double contour nozzle 30 with a gas stream 16 running therethrough. In some embodiments, as shown in FIG. 1, the primary chamber 20 is attached to the double contour nozzle 30. In addition, as shown in FIG. 1, the primary chamber is configured to receive "primary fuel." In some embodiments, the primary fuel is at least one propellant. In some embodiments, the at least one propellant is a liquid propellant, a solid propellant, a hybrid propellant, or any combination thereof. In some embodiments, as shown in FIG. 1, the rocket engine 10 has an axial length (dashed line between elements 12 and 14). In some embodiments, as shown in FIG. 1, the rocket engine 10 has a first end 12 at a first end of the rocket engine's axial length and a second end 14 at a second end of the rocket engine's axial length.

Figure 2:
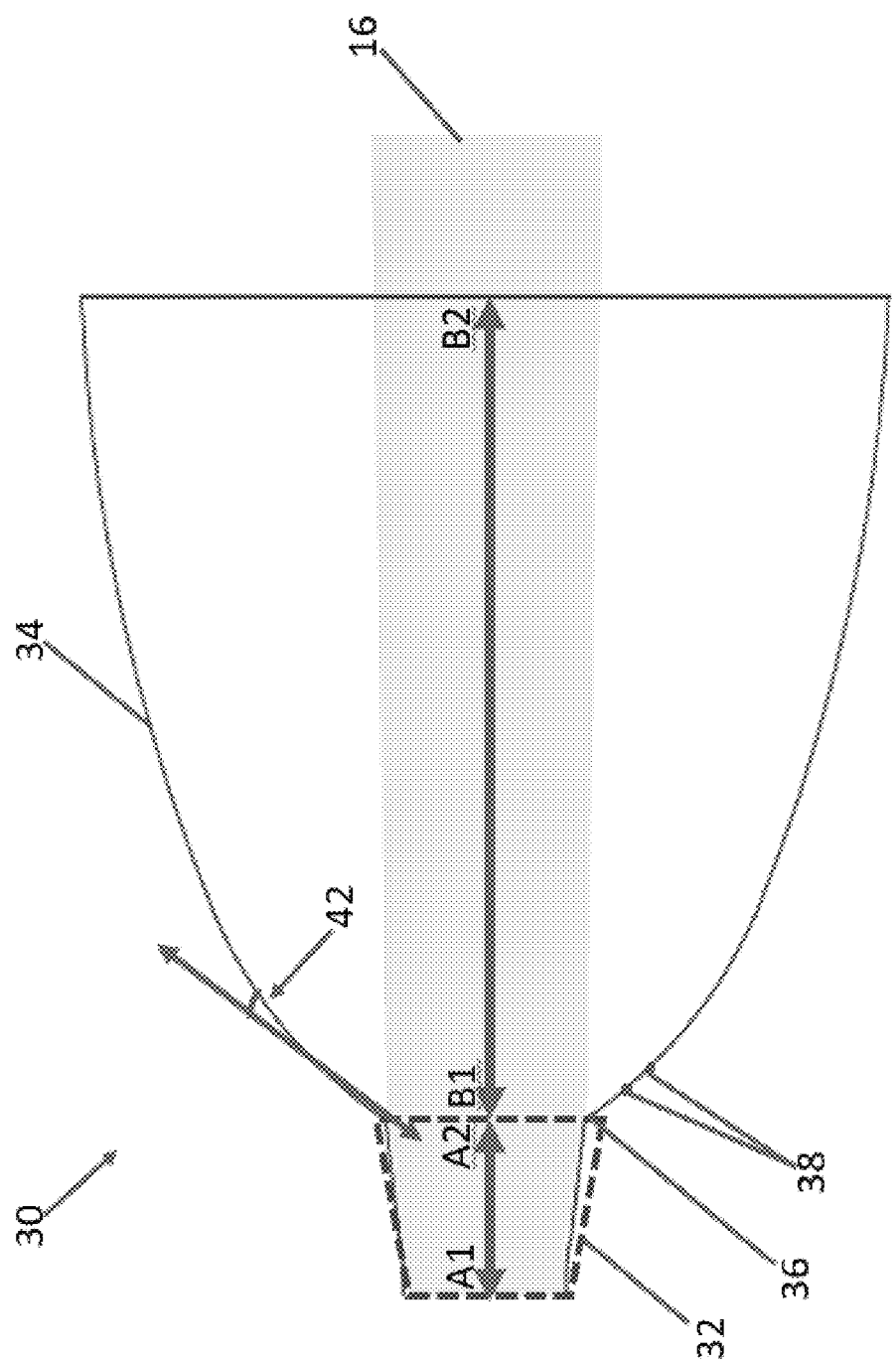
FIG. 2 is a cross-sectional view of dual contour nozzle of the rocket engine one FIG. 1 according to an embodiment of the present disclosure.

FIG. 2 depicts a cross-section of the double contour nozzle 30 of FIG. 1. As shown in FIG. 2, in some embodiments, the double contour nozzle 30 includes an inner contour nozzle 32 having a conical contour and an outer contour nozzle 34 having a bell contour. As shown in FIG. 2, in some embodiments, the inner contour nozzle 32 includes an axial length (dashed line between A1 and A2) from a first end A1 of the inner contour nozzle to the second end A2 of the inner contour nozzle. In some embodiments, as shown in FIG. 2, the outer contour nozzle includes an axial length (dashed line between B1 and B2) from a first end B1 of the outer contour nozzle to a second end B2 of the outer contour nozzle.

As shown in FIG. 2, in some embodiments, the double contour nozzle includes a contour break point 36 between the inner contour nozzle 32 and the outer contour nozzle 34. In some embodiments, as shown in FIG. 2, the outer contour nozzle 34 is downstream of the contour break point 36. In addition, as shown in FIG. 2, in some embodiments, the outer contour nozzle includes a plurality of propellant injection orifices 38. In some embodiments, the plurality of propellant injection orifices 38 are configured to receive at least one of a solid propellant, a liquid propellant, a hybrid propellant, or any combination thereof. As shown in FIG. 2, at least one propellant injection orifice 38 is positioned downstream of the contour break point 36 from 0-15% along the axial length (B1-B2) of the outer contour nozzle 34.

In some embodiments, as shown in FIG. 2, the outer contour nozzle 34 comprises a tangency angle 42 from 40 to 90 degrees on a surface adjacent to the contour break point. In addition, as shown in FIG. 2, in some embodiments, the outer contour nozzle 34 comprises a radius of curvature of less that 0.75 on a surface adjacent to the contour break point 36.

Figure 3:
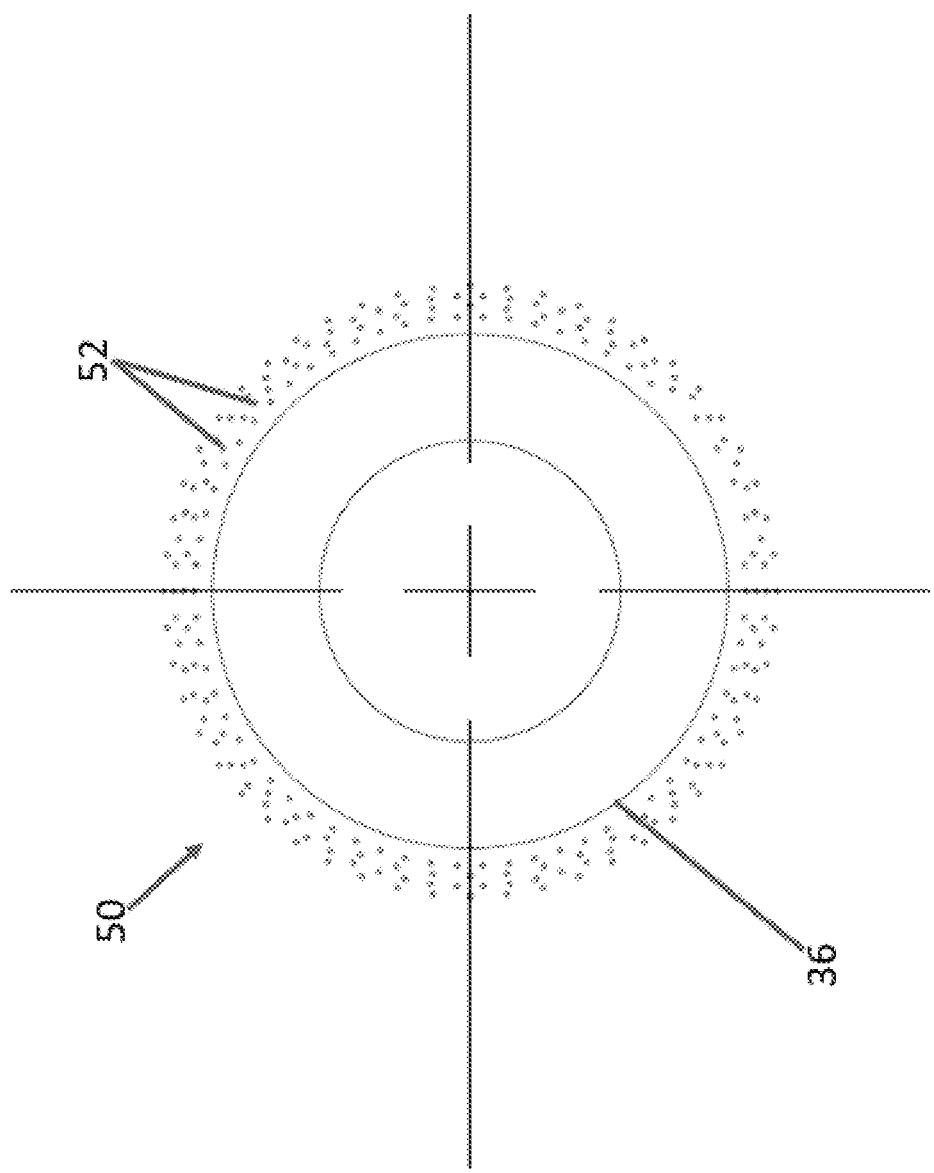
FIG. 3 depicts an augmenter according on embodiment of the present invention.

FIG. 3 depicts an augmenter 50 according to an embodiment of the present disclosure. As shown in FIG. 3, in some embodiments, the augmenter 50 includes a plurality of propellent injector orifices 52 positioned in concentric circles. As shown in FIG. 3, in some embodiments, the augmenter 50 is positioned downstream of the contour break point 36 in the outer contour nozzle 34.

Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of" and "consisting of" may be replaced with either of the other two terms, without altering their respective meanings as defined herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

What is claimed:

1. A rocket engine, comprising:
   a primary chamber;
   a double contour nozzle attached to the primary chamber, wherein the double contour nozzle comprises
      an inner contour nozzle comprising a conical contour;
      an outer contour nozzle comprising
         a bell contour, and
         at least one propellant injection orifice,
            wherein the at least one propellant injection orifice comprises at least one orifice that is configured to receive an oxidizer; and
      a contour break point between the inner contour nozzle and the outer contour nozzle;
   wherein the outer contour nozzle comprises a radius of curvature of less than 0.75 on a surface adjacent to the contour break point.

2. The rocket engine of claim 1, wherein the radius of curvature on the surface of the contour nozzle adjacent to the contour break point is less than 0.5.

3. The rocket engine of claim 1, wherein the outer contour nozzle comprises a plurality of propellant injection orifices.

4. The rocket engine of claim 1, further comprising an augmenter.

5. The rocket engine of claim 1, wherein the outer contour nozzle further comprises
   an outer contour nozzle exit, and
   an axial length extending from the contour break point to the outer contour nozzle exit; and
   wherein the at least one propellant injection orifice is positioned downstream of the contour break point from 0-15% along the axial length of the outer contour nozzle.

6. The rocket engine of claim 5, wherein the at least one propellant injection orifice is positioned downstream of the contour break point from 0-10% along the axial length of the outer contour nozzle.

7. The rocket engine of claim 1, wherein the primary chamber is configured to receive a liquid propellant, a solid propellant, a hybrid propellant, or any combination thereof.

8. The rocket engine of claim 1, wherein the at least one propellant injection orifice is configured to receive a liquid propellant, a solid propellant, a hybrid propellant, or any combination thereof.

9. A rocket engine, comprising:
    a primary chamber;
    a double contour nozzle attached to the primary chamber, wherein the double contour nozzle comprises
        an inner contour nozzle comprising a conical contour,
        an outer contour nozzle comprising
            a bell contour,
            an outer contour nozzle exit, and
            at least one propellant injection orifice,
                wherein the at least one propellant injection orifice comprises at least one orifice that is configured to receive an oxidizer, and
        a contour break point between the inner contour nozzle and the outer contour nozzle,
        wherein the outer contour nozzle further comprises an axial length extending from the contour break point to the outer contour nozzle exit, and
        wherein the at least one propellant injection orifice is positioned downstream of the contour break point from 0-15% along the axial length of the outer contour nozzle.

10. The rocket engine of claim 9, wherein the outer contour nozzle comprises a radius of curvature of less than 0.75 on a surface adjacent to the contour break point.

11. The rocket engine of claim 9, wherein the outer contour nozzle comprises a plurality of propellant injection orifices.

12. The rocket engine of claim 9, wherein the outer contour nozzle further comprises an augmenter.

13. The rocket engine of claim 12, wherein the augmenter is positioned within the outer contour nozzle downstream of the contour break point from 0-15% along the axial length of the outer contour nozzle.

14. The rocket engine of claim 13, wherein the augmenter is positioned within the outer contour nozzle downstream of the contour breakpoint from 0-10% along the axial length of the outer contour nozzle.

15. The rocket engine of claim 9, wherein the at least one propellant injection orifice is positioned downstream of the contour break point from 0-10% along the axial length of the outer contour nozzle.

16. The rocket engine of claim 9, wherein the primary chamber is configured to receive a liquid propellant, a solid propellant, a hybrid propellant, or any combination thereof.

17. The rocket engine of claim 9, wherein the at least one propellant injection orifice is configured to receive a liquid propellant, a solid propellant, a hybrid propellant, or any combination thereof.

* * * * *